Figure 2:
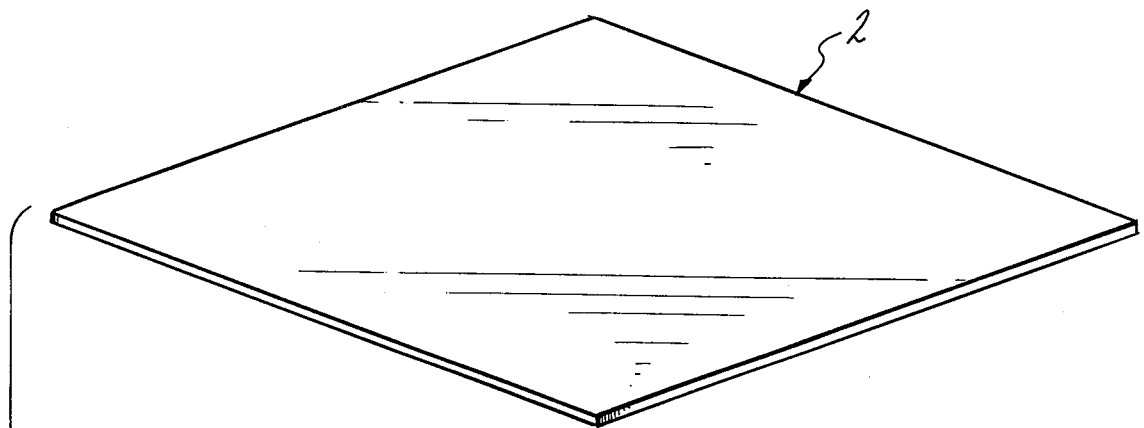

United States Patent [19]

Wardlaw et al.

[11] 4,204,015
[45] May 20, 1980

[54] INSULATING WINDOW STRUCTURE AND METHOD OF FORMING THE SAME

[76] Inventors: Stephen C. Wardlaw, 128 Sunset Hill Dr., Branford, Conn. 06405; Robert A. Levine, 31 Pilgrim La., Guilford, Conn. 06437

[21] Appl. No.: 892,516

[22] Filed: Apr. 3, 1978

[51] Int. Cl.² ............................. B32B 3/10; E06B 3/00
[52] U.S. Cl. .................................... 428/34; 156/109; 428/119; 428/120; 428/138; 428/178; 428/332
[58] Field of Search ................ 428/34, 119, 120, 118, 428/139, 140, 437, 137, 138, 178, 166, 332; 156/101, 104, 108, 109; 52/171, 616, 172

[56] References Cited

U.S. PATENT DOCUMENTS

| | | | |
|---|---|---|---|
| 1,370,974 | 3/1921 | Kirlin | 428/34 |
| 1,988,964 | 1/1935 | Barrows | 20/56.5 |
| 2,028,670 | 1/1936 | Hosking | 154/53 |
| 2,695,430 | 11/1954 | Wakefield | 20/56.5 |
| 2,828,235 | 3/1958 | Holland et al. | 154/118 |
| 3,160,925 | 12/1964 | Gort | 20/15 |
| 3,234,062 | 2/1966 | Morris | 428/437 |
| 3,341,399 | 9/1967 | Hazdra et al. | 428/437 |
| 3,940,898 | 3/1976 | Kaufman | 428/34 |
| 3,981,294 | 9/1976 | Deminet et al. | 52/616 |
| 4,035,539 | 7/1977 | Luboshez | 428/178 |

FOREIGN PATENT DOCUMENTS

1138992  1/1969  United Kingdom ................. 428/34

Primary Examiner—Paul J. Thibodeau
Attorney, Agent, or Firm—William W. Jones

[57] ABSTRACT

A multi-layered windowpane which is substantially transparent and possesses superior insulating properties. The outer and inner layers are glass and between each glass layer there is a perforated layer of substantially transparent plastic.

7 Claims, 2 Drawing Figures

INSULATING WINDOW STRUCTURE AND METHOD OF FORMING THE SAME

This invention relates to a windowpane structure which displays improved insulating properties and which has the ability to be cut to size from a large blank without the sized cut piece losing its insulating properties.

The provision of glass pane assemblies which display improved insulation properties is, of course, well known in the art. The most commonly used assembly consists of two panes of glass which are spaced apart at their edges and which are mounted in a special frame. The dead air space between the inner and outer glass panes acts as an insulator. Despite the good insulating properties exhibited by this assemblage, there are certain drawbacks inherent in it. It must be carefully put together away from the job site in a special moisture-free area so that no condensation will form on the inner surface of the outer glass pane. It must be preassembled in special heavy frames before being taken to the job site. Therefore, the above-described insulating glass assemblage is expensive, must be specially ordered, and takes time to assemble. This type of assemblage, further, is not as efficient as it could be since the air space between the glass panes cannot usually be evacuated because the glass panes would then bow toward each other and touch across the evacuated air space.

We have devised an improved insulating windowpane structure which may be mass-produced in stock material form. The windowpane structure of this invention may be cut to size on the job site or at any other site without requiring any special humidity controls at the site. The windowpane structure of this invention may also have its internal air space evacuated without causing collapse of the glass panes, thereby improving the insulating properties of the assemblage. No specially constructed frame need be constructed to mount the window of this invention.

The windowpane assemblage of this invention is made from a plurality of layers laminated together to form a sandwich construction. The innermost and outermost layers are glass. Between each glass layer there is a layer of perforated sheet plastic. The opposite faces of the sheet plastic layer are preferably bonded over their entire extents to the respective glass sheets. In this manner, each of the perforations through the plastic sheet forms a separate cell within the laminate. If the lamination is made under reduced pressure, then each cell will be at least partially evacuated. Additionally, the laminate may be filled with a gas, such as R-11 ($CCl_3F$), which is substantially less thermally conductive than air. Thus, the insulating characteristics of the laminate are improved. The opposing glass panes will not collapse toward each other due to the intervening plastic mesh layer. It will be appreciated that there must be at least three layers in the subject laminate; however, there may also be more than three layers, if so desired.

It is, therefore, an object of this invention to provide a windowpane having improved insulating characteristics.

It is another object of this invention to provide a windowpane of the character described which can be mass-produced in stock form.

It is yet an additional object of this invention to provide a windowpane of the character described which can be cut to size from stock without the need of maintaining any particular humidity conditions during cutting.

It is a further object of this invention to provide a windowpane of the character described wherein the free space between opposed glass layers can be at least partially evacuated and/or filled with a gas of low thermal conductivity to increase the insulation characteristics of the windowpane.

It is yet a further object of this invention to provide a windowpane of the character described which can be cut to size from stock material without effectively altering the condition between the glass layers.

Figure 1:
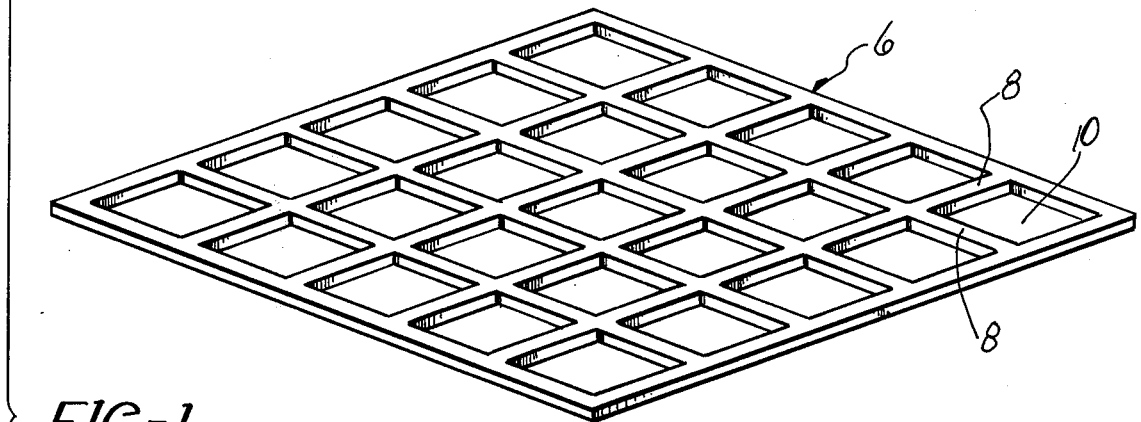
Figure 1:
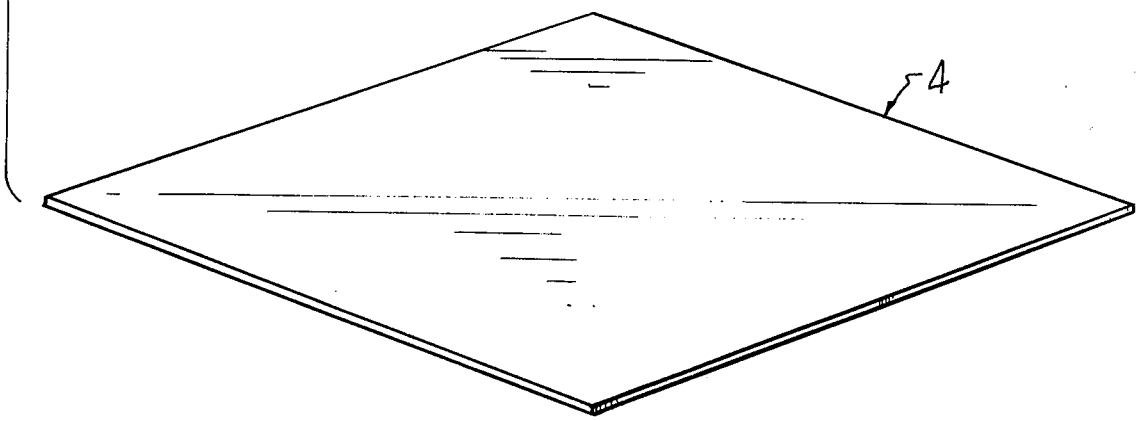

These and other objects and advantages of this invention will become more readily apparent from the following detailed description of a preferred embodiment of a windowpane formed in accordance with this invention, in which:

FIG. 1 is an exploded perspective view of a three-layer embodiment of the windowpane of this invention; and FIG. 2 is a cross-sectional view of the windowpane of FIG. 1.

Referring now to the drawings, a three-layer embodiment of the windowpane of this invention is shown. The inner and outer layers 2 and 4 are both glass sheets. The intermediate layer 6 is a perforated layer of plastic such as polycarbonate, polyvinyl butyral, cellulose acetate butyrate, filled or unfilled acrylics, flurocarbon polymers, etc. The material preferred for the intermediate layer 6 is selected from the group consisting of vinyl polymers, acrylic polymers, flurocarbon plastics and polycarbonates. It will be noted that the intermediate layer 6 is in the form of a lattice or lace of gas impermeable plastic consisting of crossing strands 8 which define the lateral boundaries of a plurality of perforations 10 extending through the plastic layer 6. It will also be noted that the opposite surfaces of the layer 6 are flat and all of the same side surfaces (inner or outer) of the strands 8 are contained in the same plane.

It will be noted that, when the layers 2, 4 and 6 are laminated together, the perforations 10 are converted into individual cells 12 (see FIG. 2) which are integral parts of the laminate and are completely isolated from the other cells 12 in the laminate. The isolation of the cells 12 from each other and ambient conditions is accomplished solely by bonding substantially the entirety of the opposite surfaces 14 and 16 of the intermediate layer to the glass layers 2 and 4, respectively.

While the cells 12 are shown as having a square cross-sectional configuration, it will be appreciated that other geometric configurations may be used such as circles, hexagons, etc. The perforations 10 may be formed by drilling, punching, or by molding in a "waffle" type molding cavity.

It will be readily appreciated that a relatively transparent plastic material will provide better transparency for the laminate; however, it will also be appreciated that an opaque plastic will provide acceptable transparency for the laminate provided that the strands 8 are not overly thick in the transverse dimension. The resultant transparency of the assemblage will be no less than looking through a window fitted with a screen.

The width of the perforations may vary widely; however, it must be remembered that one primary objective of this invention is to provide a windowpane laminate that can be cut to size from a stock piece without substantially lessening the insulating capabilities of the cut piece of the laminate. Thus, the width of the perforations should be kept sufficiently small to enable accomplishment of this objective.

The bonding between the glass layers and the intermediate plastic layer may be accomplished in a number of different ways. The opposite surfaces of the plastic layer or glass may be coated with a suitable adhesive to provide the bond. Alternatively, the glass layers may be heated to a temperature which will cause a softening of the plastic layer upon contact therewith, whereupon a bond will be formed between the glass and plastic layers upon subsequent cooling.

One way in which a laminate can be formed with an adhesive involves the feeding of upper and lower sheets of glass, in addition to feeding of an intermediate web of perforated plastic. An adhesive can be applied to opposite sides of the web or to the inner surfaces of the glass sheets. The sheets and web can then be fed through a pressure nip to bond the three layers together. The nip may be contained in an evacuated and/or gas-filled housing so that the cells 12 will be at least partially evacuated and/or gas-filled after the bond is made. This will increase the insulating ability of the laminate. When an adhesive is used, the bond need not be made with the application of heat.

When heated glass is used to soften the plastic web for bonding purposes, again the three components may be fed into a nip roll in an evacuated housing. The laminate will then be cooled to allow the plastic to reharden and form a bond with the glass.

Since one of the primary objectives of this invention is to provide an insulating windowpane material which can be cut to size on the job, it follows that the lateral dimensions of each perforation 10 be relatively small compared to the lateral dimensions of commonly used windowpanes. We prefer to insure that at least 80% of the cut pane retains the integral cell structure so that the improved insulating effect resulting from evacuation of the cells will persist. It will, of course, be understood that any cells which are on the edge of the pane will be interrupted and that the vacuum therein will be destroyed. However, the remainder of the cells in the pane will maintain their integrity. Therefore, different size perforations can be made in the stock material for different size commonly used panes. Stock from which smaller commonly used panes are made can be formed with smaller perforations, and stock from which larger commonly used panes are made can be formed with larger perforations without losing the 80% minimum integral cell structure which is preferred.

It will be appreciated that the intermediate plastic web will both conduct heat and will lower the transparency of the outer glass panes, and thus lower the transparency of the laminate. Therefore, in order to maximize the transparency of the laminate and to maximize the insulating ability of the laminate, while preserving the workability of the plastic web, we prefer to maintain the percentage of area contact between the glass layers and the plastic web at no more than about 10%. This percentage can, of course, be increased in an application that does not require maximum transparency, or can tolerate a lesser than maximized insulating ability.

It will also be appreciated that the thickness of the intermediate plastic web also has an effect on both transparency and insulating ability. The thicker the plastic web is, the better the insulation since the cells will be thicker; however, at the same time, a thicker plastic web will adversely affect the transparency of the pane due to internal reflections. Therefore, a compromise must be made. We have found that a web thickness in the range of about 0.020" to about 0.200" will provide optimum insulation and transparency for most applications. Values outside this range can, of course, be tolerated in the event that either transparency or insulating qualities is the dominant objective of the application.

While glass is the preferred external layer material, it will be readily appreciated that any rigid, transparent, gas-impermeable, plastic material may be substituted for glass in certain applications without departing from the spirit of this invention.

Since many changes and variations of the disclosed embodiment of the invention may be made without departing from the inventive concept, it is not intended to limit the invention otherwise than as required by the appended claims.

What is claimed is:

1. An improved laminate for use in making thermally insulated window panes, said laminate comprising at least two gas-impermeable transparent relatively rigid panels, and at least one plastic panel sandwiched between said rigid panels, said plastic panel having opposed planar surfaces which are bonded over substantially their entire extent to respective ones of said rigid panels, said plastic panel having a multiplicity of through perforations laterally surrounded by gas impermeable strand-like portions of said plastic panel, each of said perforations being completely isolated from the others and from ambient surroundings by said rigid panels and said strand-like portions of said plastic panel, to form a multiplicity of isolated cells within the laminate, said cells being sized so that a large stock piece of said laminate can be cut in substantially any direction to form a smaller pane with retention of at least 80% of said isolated cell structure in said smaller pane whereby thermal insulating properties of the cut pane will not be materially altered, the isolation of said cells from each other and from ambient surroundings being provided solely by said rigid panels and by said strand-like portions of said plastic panel.

2. The laminate of claim 1 wherein said cells are at least partially evacuated.

3. The laminate of claim 1, wherein said cells contain a gas which has a lower thermal coefficient than air.

4. The laminate of claim 1, wherein said perforations occupy at least about 90% of the area of said plastic panel.

5. The laminate of claim 1, wherein said plastic panel is formed from a substantially transparent plastic.

6. The laminate of claim 1, wherein said plastic panel has a thickness in the range of about 0.020 in. to 0.200 in.

7. The laminate of claim 1, wherein said rigid panels are glass.

* * * * *